Oct. 21, 1952     O. M. GARMON     2,614,438
MULTIPLE POSITION CONTROL DEVICE FOR AIRCRAFT
Filed May 15, 1950     2 SHEETS—SHEET 1
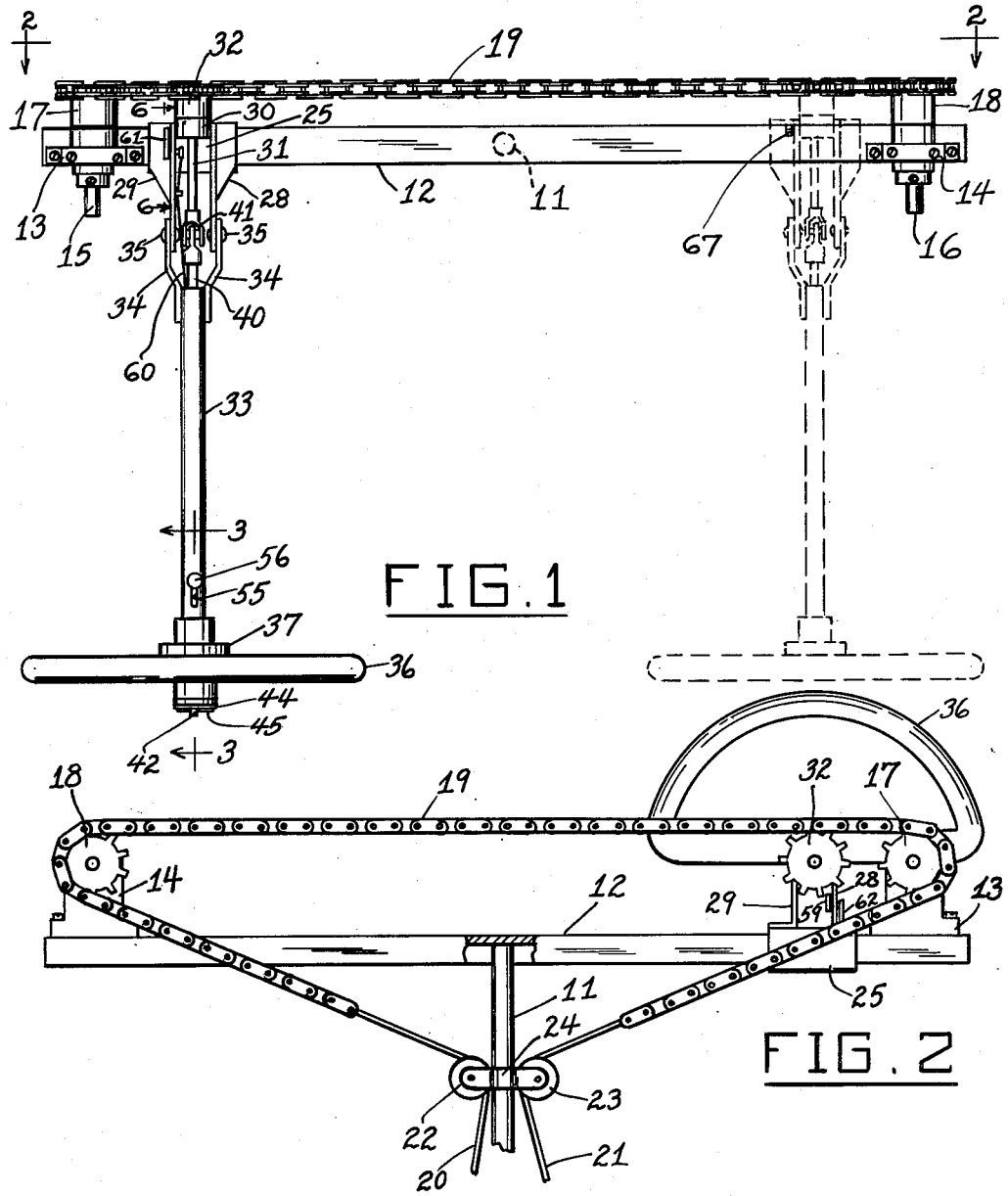
INVENTOR
ORION M. GARMON
BY Herman L. Gordon
ATTORNEY Oct. 21, 1952 — O. M. GARMON — 2,614,438
MULTIPLE POSITION CONTROL DEVICE FOR AIRCRAFT
Filed May 15, 1950 — 2 SHEETS—SHEET 2
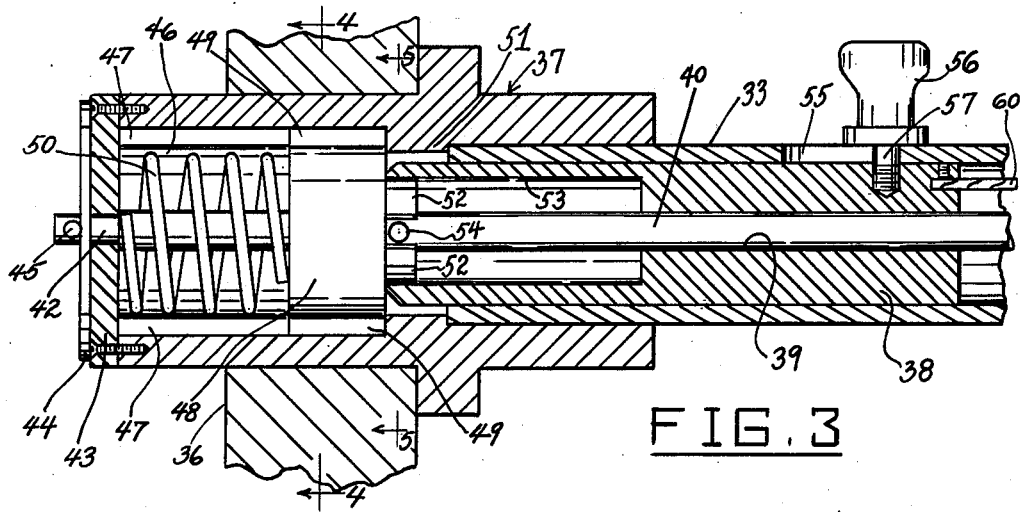
FIG. 3
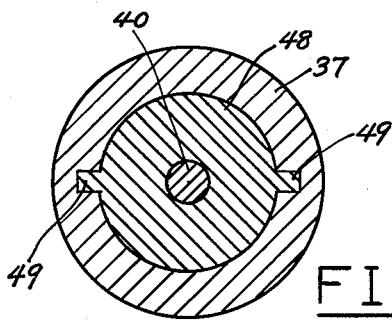
FIG. 4
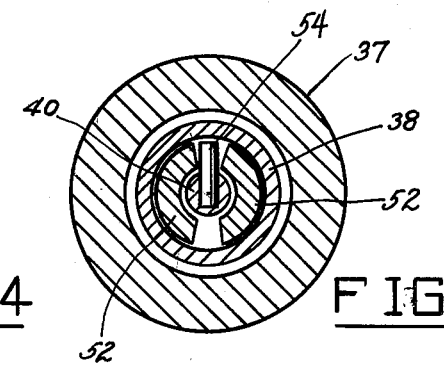
FIG. 5
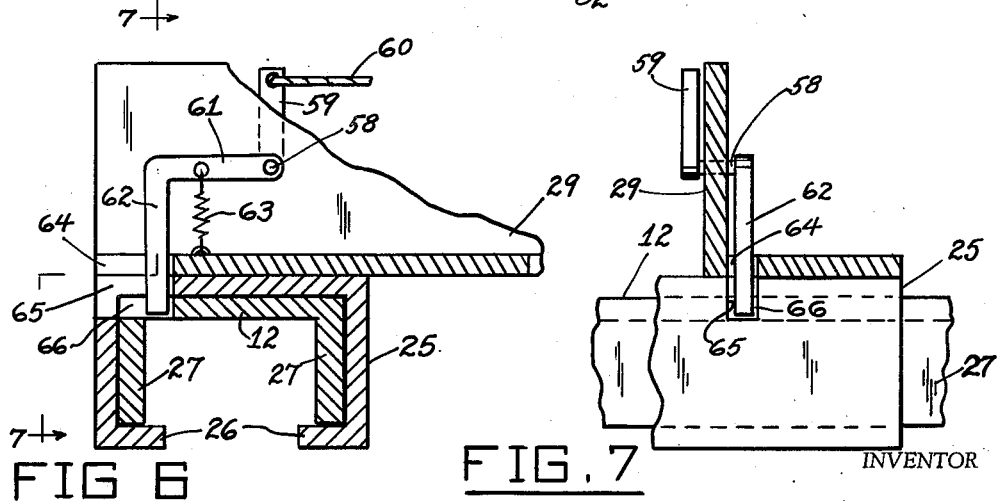
FIG. 6
FIG. 7
INVENTOR
ORION M. GARMON
BY Herman L. Gordon
ATTORNEY Patented Oct. 21, 1952

2,614,438

UNITED STATES PATENT OFFICE 2,614,438

MULTIPLE POSITION CONTROL DEVICE FOR AIRCRAFT

Orion M. Garmon, Richmond, Va.

Application May 15, 1950, Serial No. 161,995

8 Claims. (Cl. 74—504)

This invention relates to control apparatus for aircraft, and more particularly to an improved device for controlling the ailerons or wing flaps and the elevators of an aircraft and arranged for operation by any one of a plurality of pilots seated side-by-side in the aircraft.

A main object of the invention is to provide a novel and improved multiple-position control device for aircraft, arranged for operation by any one of a plurality of pilots seated side-by-side in an aircraft, without requiring the pilots to shift their positions, said device being very simple in construction, being reliable in operation, and being very easy to manipulate.

A further object of the invention is to provide an improved multiple-position control device for aircraft, said device being arranged so that control of the ailerons and elevators of an aircraft may be readily shifted from one pilot to another pilot seated beside the first pilot without requiring either pilot to change his position, the device involving relatively few parts, being rugged in construction, and being very easy to install on an aircraft, such installation involving very little modification of a conventional aircraft.

A still further object of the invention is to provide an improved control apparatus for regulating the elevators and ailerons of an aircraft, said apparatus being laterally shiftable, so that control of the ailerons and elevators may be readily transferred from one pilot to another pilot seated beside the first pilot without requiring either pilot to move, the device being arranged so that lateral shifting of the control element of the device may be accomplished without affecting the positions of the ailerons or elevators, and being further arranged so that said shifting may be effected in a rapid and convenient manner.

Further objects and advantages of the invention will become apparent from the following description and claims, and from the accompanying drawings, wherein:

Figure 1 is a top plan view of an improved multiple-position control device for aircraft constructed in accordance with the present invention.

Figure 2 is an elevational view taken on line 2—2 of Figure 1.

Figure 3 is an enlarged longitudinal cross-sectional detail view taken on line 3—3 of Figure 1.

Figure 4 is a cross-sectional detail view taken on line 4—4 of Figure 3.

Figure 5 is a cross-sectional detail view taken on line 5—5 of Figure 3.

Figure 6 is an enlarged cross-sectional detail view taken on line 6—6 of Figure 1.

Figure 7 is a cross-sectional view taken on line 7—7 of Figure 6.

Referring to the drawings, and more particularly to Figures 1 and 2, 11 designates a post or standard pivotally secured to the frame of the aircraft, by conventional means, not shown, for rotation in a vertical longitudinal plane, and connected in a conventional manner to the elevator control elements of the aircraft. Rigidly secured to the top end of the standard 11 is a downwardly-facing horizontal channel member 12. Secured on the respective end portions of the channel member 12 are the respective bearing brackets 13 and 14. Journalled in said bearing brackets transverse to the channel member 12 are the respective shaft elements 15 and 16, on which are secured the respective sprockets 17 and 18. Engaging over the sprockets 17 and 18 is the sprocket chain 19. Secured to the ends of the sprocket chain 19 are the respective cables 20 and 21, connected to the ailerons or wing flaps on the respective opposite sides of the aircraft. As shown in Figure 2, the cables are engaged over respective pulleys 22 and 23 rotatively mounted on a bracket 24 secured to standard 11.

Designated at 25 is a short channel-shaped member slidably mounted on the channel member 12 and formed with inturned bottom flanges 26, 26 slidably engaging the bottom edges of the depending side flanges 27, 27 of the member 12, as shown in Figure 6, restraining said member 25 against upward movement with respect to member 12. Secured on the member 25 are the opposed, parallel, transversely extending angle bars 28, 29, and secured between the upstanding flanges of said angle bars is a bearing 30. Journalled in said bearing 30 is a shaft 31 on which is secured a sprocket 32 engaged with sprocket chain 19.

Designated at 33 is an elongated sleeve member, to the rear end of which are secured the diametrically opposed, outwardly offset bracket bars 34, 34. The ends of bracket bars 34, 34 are pivotally secured at 35, 35 to the ends of the upstanding flanges of the angle bars 28, 29, the axes of the pivotal connections 35, 35 being in alignment and being parallel to channel member 12, so that the sleeve member 33 may be rotated freely in a plane transverse to said channel member.

Designated at 36 is a hand-wheel which is secured on a hub 37 rotatably mounted on the forward end portion of the sleeve member 33. Slidably mounted in the forward end portion of said sleeve member is a plunger 38 formed with an axial bore 39. Rotatably mounted in bore 39 is a shaft member 40 extending axially through sleeve member 33. The rear end of shaft member 40 is connected to the forward end of shaft 31 by a universal joint 41, said universal joint being in alignment with the pivotal connections 35, 35. The forward end of shaft member 40 is formed with a reduced stud portion 42 which extends rotatably through the end wall 43 of hub 37, through a washer 44, and is secured by a transverse pin 45, as shown in Figures 1 and 3.

Hub 37 is formed with a large axial bore 46 having the opposed longitudinal keyways 47, 47.

Designated at 48 is a tubular cylindrical plunger through which shaft member 40 slidably passes and in which said shaft member is rotatable. Plunger 48 is longitudinally slidable in bore 46 and is formed with opposed longitudinal ribs 49, 49 slidably receivable in the keyways 47, 47. Designated at 50 is a coiled spring encircling the portion of shaft member 40 located inwardly adjacent hub wall 43 and bearing between plunger 48 and said hub wall. Spring 50 biases plunger 48 against the left end of plunger 38, as viewed in Figure 3, and against an annular internal abutment 51 formed inside the hub 37.

Plunger 48 is formed with opposed arcuate ribs 52, 52 which are receivable within an enlarged bore portion 53 formed in the plunger 38, as shown in Figure 3. Secured to shaft member 40 is a transversely projecting pin 54 lockingly receivable between the ends of the opposing arcuate ribs 52, 52, as shown in Figures 3 and 5, to key the hub 37 normally to the shaft member 40, whereby rotation of hand wheel 36 normally causes sprocket 32 to shift chain 19 and to operate the ailerons.

Sleeve member 33 is formed with a longitudinal slot 55. Designated at 56 is a knob having a shank 57 which extends through slot 55 and is threaded into plunger 38. It will be seen that by moving knob 56 to the left, as viewed in Figure 3, the left end of plunger 38 forces plunger 48 to the left against the pressure of spring 50, whereby the pin 54 may be disengaged from between the ends of the arcuate ribs 52, 52, and the hand wheel 36 and hub 37 may be rotated around the shaft member 40.

Extending rotatably through the upstanding flange of the angle bar 29 is a short horizontal shaft element 58, to the inner end of which is secured an upstanding arm 59. The upper end of arm 59 is connected to plunger 38 by a flexible cable 60 which extends through the sleeve member 33. Secured to the outer end of shaft element 58 is an arm 61 formed with a depending finger 62. Arm 61 is biased downwardly by a coiled spring 63 connecting said arm to the horizontal flange of angle bar 29. As shown in Figure 6, the horizontal flange of angle bar 29 is formed with a notch 64 and the channel member 25 is formed with a slot 65 underlying said notch, the depending finger 62 being receivable in said notch and slot. Channel member 12 is formed adjacent bearing bracket 13 with an aperture 66 vertically registrable with the slot 65 and notch 64 and arranged to receive the end of finger 62, as shown in Figure 6, whereby the channel member 25 may be locked to the channel member 12 in the position shown in full line view in Figure 1. Channel member 12 is formed adjacent bearing bracket 14 with another aperture 67, also registrable with slot 65 and notch 64, whereby the channel member 25 may be locked to the channel member 12 in the position shown in dotted view at the right side of Figure 1. In the positions of the parts shown in full line view in Figure 1, the hand wheel 36 may be operated to control the ailerons and elevators of the aircraft by a pilot seated at the left side of the aircraft. When this pilot desires to shift control of the ailerons and elevators to another pilot seated at the right side of the aircraft, he retracts knob 56, causing finger 62 to be elevated by cable 60 so that it disengages from aperture 66, freeing channel member 25 for sliding movement to the right on channel member 12. At the same time, plunger 38 is shifted to the left, as viewed in Figure 3, disengaging pin 54 from plunger 48. The pilot then moves hand wheel 36 to the right, as viewed in Figure 1, holding knob 56 retracted. When the hand wheel is within reach of the second pilot, the second pilot grasps the hand wheel and the knob 56 and continues the movement of the hand wheel to the right, holding knob 56 retracted until the depending finger 62 can be engaged in the aperture 67. When this position is reached, the knob 56 is released, allowing finger 62 to enter aperture 67. At the same time, spring 50 urges plunger 48 to the right, as viewed in Figure 3, allowing the pin 54 to engage between the ends of the arcuate ribs 52, 52, and thereby coupling the hand wheel 36 and hub 37 to shaft member 40.

Although the procedure above described calls for action by both pilots, in many cases the shift of the control device may be accomplished by either of the two pilots acting alone.

It will be noted that during the changeover of control, as above described, the shaft member 40 is free to rotate with respect to hub 37, and thus sprocket 32 rotates freely along the sprocket chain 19. Therefore, none of the aircraft control surfaces are operated by said changeover of control. The changeover can be accomplished very rapidly and requires no change of position of either pilot.

Obviously, the track 12 may be of any other suitable cross-sectional shape than channel-shape, the support means for the bearing 30 then being of suitable shape to slidably embrace the track. For example, the track 12 may be T-shaped in cross-section or may be I-shaped in cross-section.

Furthermore, the track 12 may be formed with additional slots similar to slots 66 and 67, located at intermediate positions between the end positions on the track, whereby the hand wheel 36 may be shifted to intermediate control positions on the track, as where there are more than two pilots seated side-by-side in the aircraft.

While a specific embodiment of a multiple-position control device for aircraft has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a control device for aircraft, a transversely extending support member, a wing flap-operating member, means supporting a portion of said second-named member for linear movement substantially parallel to said support member, a bearing member slidably mounted on said support member, a rotary element journalled on said bearing member, said rotary element meshingly engaging said wing flap-operating member and being arranged to move said portion parallel to said support member responsive to rotation of said element, and movable detent means carried by said bearing member and being arranged to lockingly engage said support member.

2. In a control device for aircraft, a transversely extending support member, a wing flap-operating member, means supporting a portion of said second-named member for linear movement substantially parallel to said support member, a bearing member slidably mounted on said support member, a rotary element journalled on said bearing member, said rotary element meshingly engaging said wing flap-operating member and being arranged to move said portion parallel to said support member responsive to rotation of said element, movable detent means carried by said bearing member and being arranged to lockingly engage said support member, a handle element, means releasably coupling said handle element to said rotary element, and means connecting said coupling means to said movable detent means.

3. A multiple-position control device for aircraft comprising a transverse horizontal support member, a pair of spaced bearing elements secured to said support member, respective sprockets journalled on said bearing elements, a sprocket chain engaged with said sprockets, respective wing flap-operating elements connected to the ends of the chain, an additional bearing element slidably mounted on said transverse support member, a sprocket journalled on said additional bearing element and engaging said chain, a control shaft connected to said last-named sprocket, and movable detent means carried by said additional bearing element and being lockingly engageable with said support member.

4. A multiple-position control device for aircraft comprising a transverse horizontal support member, a pair of spaced bearing elements secured on said support member, respective sprockets journalled on said bearing elements, a sprocket chain engaged with said sprockets, respective wing flap-operating elements connected to the ends of the chain, an additional bearing element slidably mounted on said transverse support member, a sprocket journalled on said additional bearing element and engaging said chain, a control shaft connected to said last-named sprocket, said support member being formed with a plurality of spaced socket elements, and movable detent means carried by said additional bearing element selectively engageable with said socket elements.

5. A multiple-position control device for aircraft comprising a transverse horizontal support member, a pair of spaced bearing elements secured on said support member, respective sprockets journalled on said bearing elements, a sprocket chain engaged with said sprockets, respective wing flap-operating elements connected to the ends of the chain, an additional bearing element slidably mounted on said transverse support member, a sprocket journalled on said additional bearing element and engaging said chain, a control shaft connected to said last-named sprocket, a handle element, means releasably coupling said handle element to said shaft, a movable uncoupling member carried on said shaft and engaging said coupling means, movable detent means carried by said additional bearing element and being lockingly engageable with said support member, and means connecting said uncoupling member to said movable detent means.

6. A multiple-position control device for aircraft comprising a transverse horizontal support member, a pair of spaced bearing elements secured on said support member, respective sprockets journalled on said bearing elements, a sprocket chain engaged with said sprockets, respective wing flap-operating elements connected to the ends of the chain, an additional bearing element slidably mounted on said transverse support member, a sprocket journalled on said additional bearing element and engaging said chain, a control shaft connected to said last-named sprocket, a sleeve connected to said additional bearing element, a plunger slidably mounted in said sleeve, said control shaft extending through said plunger, a handle element rotatably mounted on said sleeve, a projection on said shaft, an axially movable clutch element carried by said handle element and formed to interlock with said projection, spring means biasing said clutch element into engagement with said projection, said plunger being engageable with said clutch element, movable detent means carried by said additional bearing element and being lockingly engageable with said support member, and means connecting said plunger to said movable detent means.

7. A multiple-position control device for aircraft comprising a transverse horizontal support member, a pair of spaced bearing elements secured on said support member, respective sprockets journalled on said bearing elements, a sprocket chain engaged with said sprockets, respective wing flap-operating elements connected to the ends of the chain, an additional bearing element slidably mounted on said transverse support member, a sprocket journalled on said additional bearing element and engaging said chain, a control shaft connected to said last-named sprocket, a sleeve connected to said additional bearing element, a plunger slidably mounted in said sleeve, said control shaft extending through said plunger, a handle element rotatably mounted on said sleeve, a projection on said shaft, an axially movable clutch element carried by said handle element and formed to interlock with said projection, spring means biasing said clutch element into engagement with said projection, said plunger being engageable with said clutch element, said support member being formed with a plurality of spaced openings, a movable detent element carried by said additional bearing element selectively engageable in said openings, spring means biasing said detent element into engagement with said support member, and means connecting said plunger to said movable detent element.

8. In a control device for aircraft, a transversely extending support member, a wing flap-operating member, means supporting a portion of said second-named member for linear movement substantially parallel to said support member, a bearing member slidably mounted on said support member, a rotary element journalled on said bearing member, said rotary element being arranged to move said portion parallel to said support member responsive to rotation thereof, movable detent means carried by said bearing member and being arranged to lockingly engage said support member, a handle element, and means connected to said movable detent means and being arranged to releasably couple said handle element to said rotary element.

ORION M. GARMON.

REFERENCES CITED

The following references are of record in the file of this patent:

UNITED STATES PATENTS

| Number | Name | Date |
|---|---|---|
| 1,492,266 | Ray | Apr. 29, 1924 |
| 1,536,515 | Methlin | May 5, 1925 |

FOREIGN PATENTS

| Number | Country | Date |
|---|---|---|
| 667,775 | France | Oct. 21, 1929 |